(12) United States Patent
Gupta et al.

(10) Patent No.: US 10,430,389 B1
(45) Date of Patent: Oct. 1, 2019

(54) DEADLOCK-FREE LOCKING FOR CONSISTENT AND CONCURRENT SERVER-SIDE FILE OPERATIONS IN FILE SYSTEMS

(71) Applicant: EMC IP Holding Company LLC, Hopkinton, MA (US)

(72) Inventors: Nishesh Gupta, Sunnyvale, CA (US); Julio Lopez, Mountain View, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 433 days.

(21) Appl. No.: 15/282,124

(22) Filed: Sep. 30, 2016

(51) Int. Cl.
  *G06F 7/00* (2006.01)
  *G06F 17/00* (2019.01)
  *G06F 16/176* (2019.01)
  *G06F 7/08* (2006.01)
  *G06F 16/13* (2019.01)

(52) U.S. Cl.
  CPC ............ *G06F 16/1774* (2019.01); *G06F 7/08* (2013.01); *G06F 16/13* (2019.01)

(58) Field of Classification Search
  None
  See application file for complete search history.

(56) References Cited

U.S. PATENT DOCUMENTS

| | | | | |
|---|---|---|---|---|
| 7,890,529 B1* | 2/2011 | Srinivasan | ............ | G06F 16/134 |
| | | | | 707/781 |
| 8,655,848 B1* | 2/2014 | Leverett | ................ | G06F 16/178 |
| | | | | 707/660 |
| 2003/0037029 A1* | 2/2003 | Holenstein | .......... | G06F 16/2343 |
| 2012/0284317 A1* | 11/2012 | Dalton | .................... | G06F 16/13 |
| | | | | 707/827 |
| 2014/0122428 A1* | 5/2014 | Zhou | ..................... | G06F 11/202 |
| | | | | 707/623 |

* cited by examiner

*Primary Examiner* — Tuan A Pham
(74) *Attorney, Agent, or Firm* — Staniford Tomita LLP

(57) ABSTRACT

A request is received to copy a file from a source to a destination, the source being associated with a source inode, and the destination being associated with a destination inode. The source and destination inodes are sorted into a sorted order according to inode numbers identifying the source and destination inodes. Based on the sorted order, rename locks are acquired on the source and destination inodes. Based on the sorted order, inode locks are acquired on the source and destination inodes. After the rename and inode locks have been acquired, chunk map entries of the source inode are copied as entries of the destination inode to fulfill the request.

17 Claims, 11 Drawing Sheets

US 10,430,389 B1

DEADLOCK-FREE LOCKING FOR CONSISTENT AND CONCURRENT SERVER-SIDE FILE OPERATIONS IN FILE SYSTEMS

TECHNICAL FIELD

Embodiments are generally directed to data storage operations, and more specifically to server-side file system operations.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

A file system includes various procedures and data structures that an operating system uses to track and organize file system objects such as files and directories on disk. The file system may provide support for various file operations such as creating a file, writing to a file, reading a file, deleting a file, copying a file, and so forth.

A distributed file system is an example of a type of file system in which there is a central server storing files that may be accessed over a network by any number of different clients. Distributed file systems can be advantageous because they facilitate distribution of documents to multiple clients. Further, the clients do not have to use their storage resources to store files because the files are stored at a centralized storage system.

It is important for a file system to maintain a consistent state. As discussed, the file system may provide for various data structures to track file system objects. If the file system enters an inconsistent state an organization's data may be lost forever. One of the challenges with distributed file systems is maintaining consistency while also managing concurrent access. Because there can be multiple clients, there is a high likelihood that multiple clients may attempt to access the same file system object. For example, one client may issue an operation request to be performed on a file; and before the file system has a chance to complete the requested operation, another (or the same) client may request another operation on that same file.

These concurrent requests can cause the file system to enter an inconsistent or deadlocked state. For example, if an operation to copy a first file to another second file is in progress when a request to delete the first file is received, the first file may be deleted before the copy operation completes. As a result, the second file may become corrupted. As another example, there may be a concurrent request to copy the second file to the first file while the operation to copy the first file to the second file is still in progress. This situation can lead to a deadlock where the copy operations are stuck waiting for each other to complete.

There is a need for improved systems and techniques to address deadlocking and provide consistency with respect to concurrent file system operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
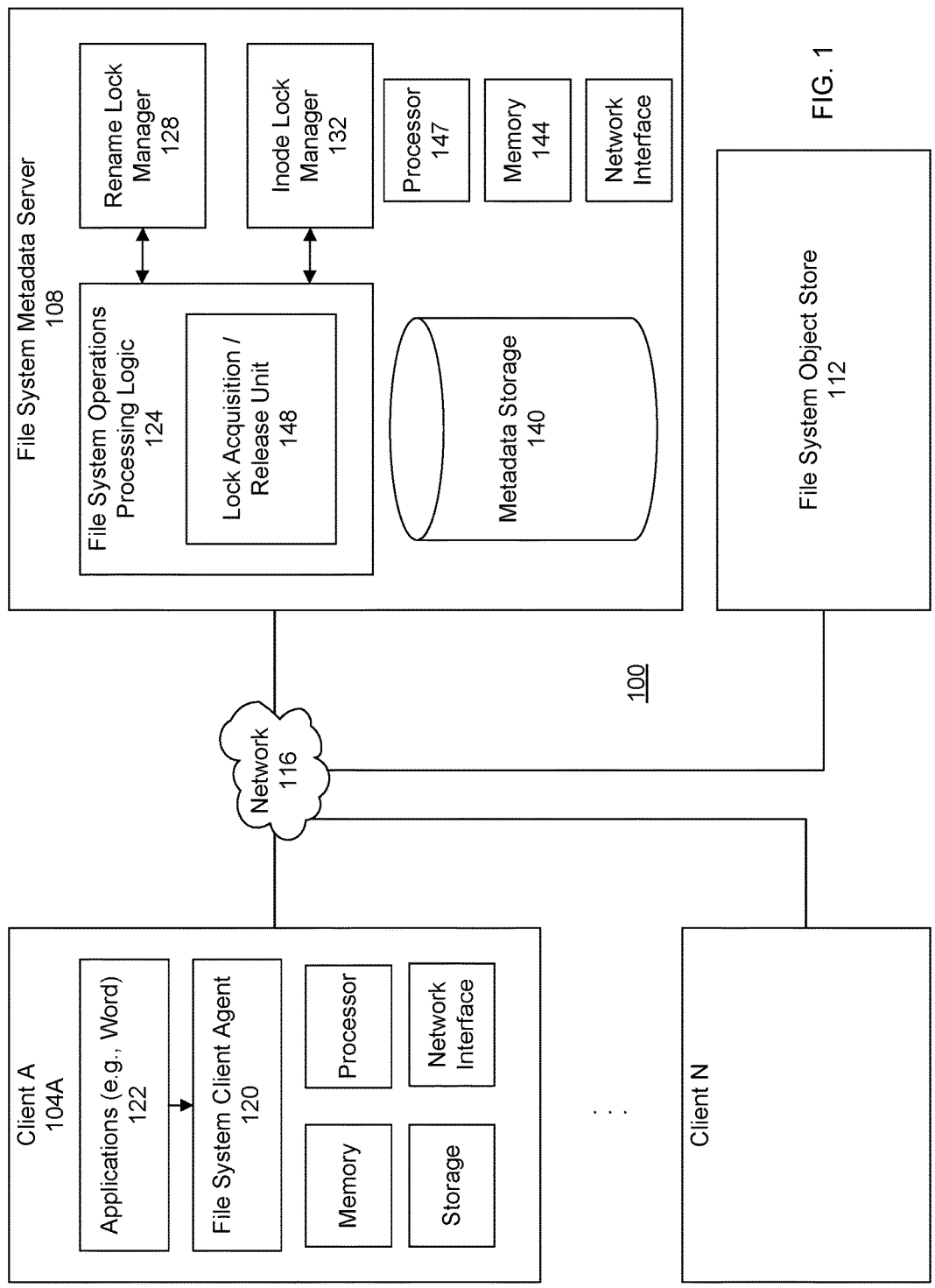
FIG. 1 is a diagram of a large-scale network implementing a system for deadlock-free locking for consistent and concurrent server-side file operations in file systems, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a non-transitory computer-usable medium having a computer-readable program code embodied therein. In the context of this disclosure, a non-transitory computer-usable medium or computer-readable medium may be any physical medium that can contain or store the program for use by or in connection with the instruction execution system, apparatus or device. For example, the non-transitory computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hard-wired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for managing and coordinating concurrent file system operations. Some embodiments of the invention may involve a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a simplified block diagram of a computing environment 100 that implements one or more embodiments of a system for managing and coordinating concurrent file system operations such as on a file, directory, or both. The environment shown in FIG. 1 includes any number of clients (e.g., client 104A . . . N), a file system metadata server 108, and a file system object store 112, each of which are interconnected by a network 116. Each client includes a file system client module or agent 120.

The network provides connectivity to the various systems, components, and resources of the distributed computer network shown in FIG. 1. The network may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

In a distributed file system, the clients and servers can be remote from each other. The clients and servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

The architecture shown in FIG. 1 may be referred to as a distributed file system in which file system services are layered over object storage. One example of a distributed file system is the Maginatics File System (MagFS) by Dell EMC of Hopkinton, Mass. It should be appreciated, however, that while some embodiments are shown and described in conjunction with the Maginatics File System, aspects and principles of the system can be applicable to other file systems.

When a file system operation is requested by a client application 122 (e.g., Microsoft Word), the file system client agent calls the metadata server. The metadata server, in turn, may then provide the client agent with authorization to access the object store (e.g., read data from the object store or write data to the object store). Some examples of file system operations include opening, closing, renaming, copying, reading, and writing a file.

Locking mechanisms can be used to help maintain the integrity of the file system metadata by protecting against or managing concurrent access. For example, a lock may be required in order to access a particular piece of data (e.g., file or inode). Other processes wishing to access the same data will then have to wait until the lock is released or returned. In some cases, a file system may receive a request to perform an operation on a particular piece of data and may receive another request to perform another operation involving that same piece of data while the originally requested operation is still in progress. These concurrent attempts to access can cause problems such as deadlocks.

For example, the file system may receive a first request to copy one file (e.g., file A) to another file (e.g., file B). While the first request is being fulfilled, a second request to perform another operation involving one or both of those same files may be received (e.g., copy file B to file A). These concurrent or simultaneous requests can result in a deadlock, i.e., a situation in which two competing operations wait for the other to finish and thus neither does.

In a specific embodiment, systems and techniques are provided to manage a server-side copy operation in which multiple inode locks are acquired in a deadlock-free manner. Besides being deadlock-free the technique ensures that it does not degrade the concurrency of all the other file system operations. In a specific embodiment, upon receipt of a request for a server-side copy operation, both rename locks and inode locks are acquired in a particular order for the processing of the server-side copy operation. The acquisition of both rename and inode locks and the order in which the locks are acquired help to ensure against deadlocks. Further discussion is provided below.

Figure 2:
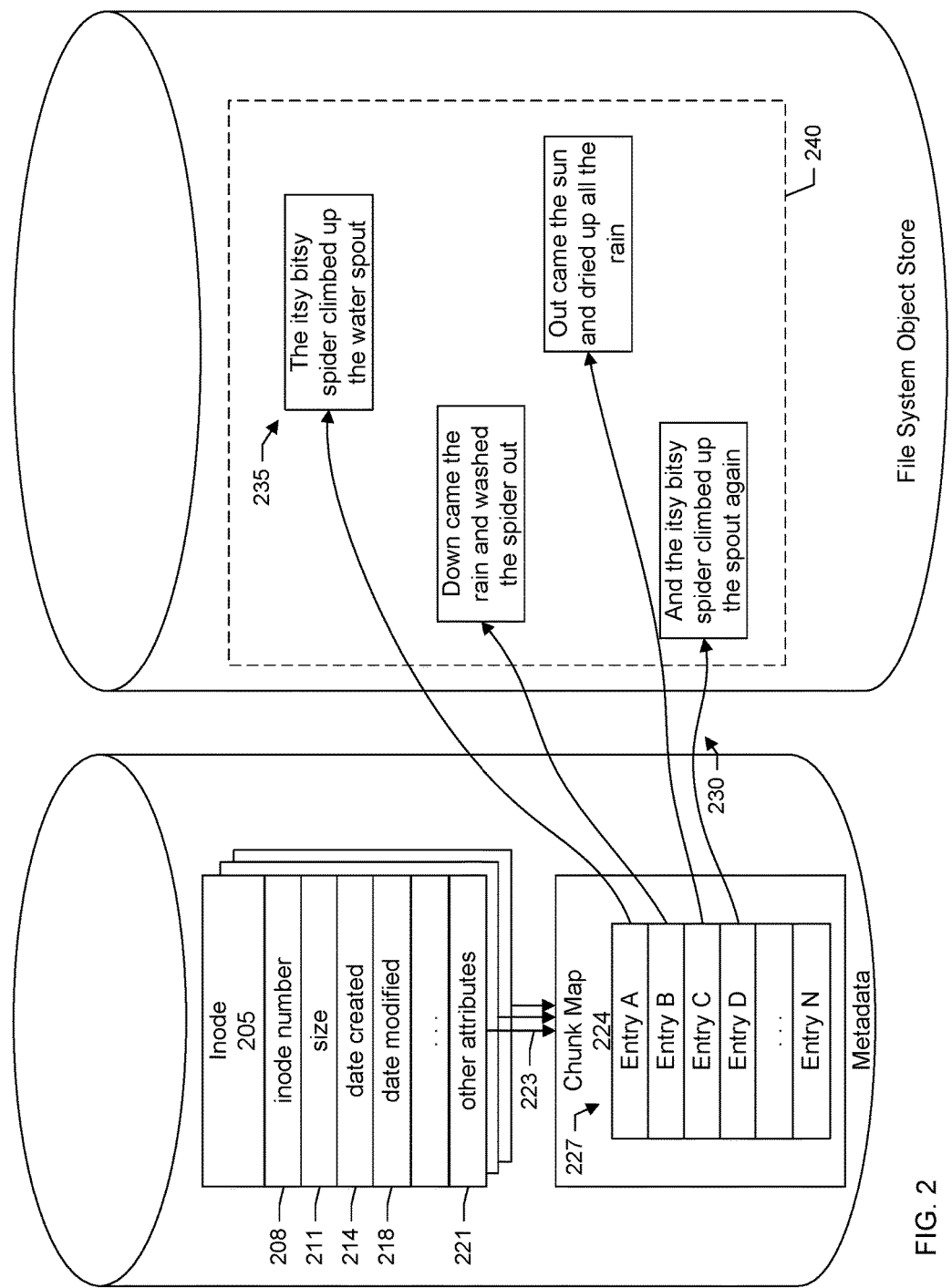
FIG. 2 shows a data structure example of an inode.

An inode is a type of data structure that may be stored by the file system. In an embodiment, each file in the file system is associated with an inode. The inode associated with a file stores metadata about the file. FIG. 2 shows a block diagram of an inode 205. The inode includes an inode number 208. The inode number uniquely identifies the inode from among other inodes in the file system. Other attributes of the inode may include a size 211 indicating a size of a file associated with the inode, date created 214 indicating a time and date the file was created, date modified 218 indicating a time and date the file was last modified, and other attributes 221 (e.g., file owner, file permissions, and so forth).

In an embodiment, the inode refers 223 to a chunk map 224. The chunk map includes a set of entries 227 storing location information or addresses mapping 230 portions of the inode to various chunks, blobs, or objects 235 stored in the object store that makeup a file 240. The chunk map is not part of the inode and is kept in a separate table. All inodes refer to a common chunk map table to get or obtain chunks and offsets in their respective files. The chunk map table stores the inode numbers and corresponding chunk locations. For example, in an embodiment, an entry or row in the chunk map table includes an inode number of a particular inode, chunk number or version, and locations of the chunks associated with the particular inode. The location information specifies the offsets where the chunks reside in the file as represented by the particular inode.

Thus, to read a file, an inode number of the file is obtained. The chunk map table is accessed, and the chunk map entries corresponding to the inode number are read. In a server-side copy operation, chunk map entries of the source inode get copied as chunk map entries of the destination inode. More specifically, consider, as an example, that an inode number of the source inode is "10" and that there are six entries in the chunk map table for the source inode. All six chunk map entries corresponding to inode number "10" in the chunk map table are read. These chunk map entries are then copied or added into the same chunk map table. The resulting six entries, however, will be associated or updated with an inode number of the destination inode (e.g., inode number "12"), but the chunk offsets remain the same as in the chunk map entries of the source inode. Thus, both the source and destination inodes will continue to point to the same chunks.

Referring back now to FIG. 1, the file system client agents installed at the client devices facilitate the presentation of a mounted file system to other applications 122 that may be installed at the client. The agent receives file operation requests from the client application (e.g., Microsoft Word) and, in turn, communicates with or calls the metadata server for access to the data. The metadata server provides authorization services and credentials to the client agent. Upon successful authorization, the metadata server may provide the client agent information indicating a location of the data (e.g., file) to be accessed on the object store, and so forth. In other words, before the file system client agent is permitted to read or write data to the object store, the client agent is authorized by the metadata server.

The file system object store is responsible for the actual storage of the data content. Content may include, for example, any type of file, documents, images, pictures, audio files, video files, and the like. The stored content may be referred to as objects, chunks, or blobs. A file may be composed of a collection of one or more chunks or blobs. Examples of object stores include EMC Atmos, Amazon S3, and others.

The file system metadata server is responsible for storing the file system metadata and managing the control plane. This includes, for example, handling communications with the file system client agents, handling communications with the object storage, storing encryption keys, authorizing requests from the client agents, securing access to the object store, handling deduplication, and performing system monitoring and management. The metadata server may be deployed on virtual machines such as within a company's data center or hosted within a cloud environment.

Specifically, the metadata server includes a file system operations processing logic 124, a rename lock manager 128, an inode lock manager 132, metadata storage 140, memory 144, and processor 147. The operations processing logic includes a lock acquisition and release unit 148.

The metadata storage includes a database to store information or metadata about the file system. The metadata may include, for example, inode data structures, chunk maps, file locations, locations of chunks making up a file, addresses, offsets, chunk reference counts, and so forth. The lock acquisition unit includes logic to acquire and release rename locks and inode locks from the respective rename and inode lock managers.

The rename lock manager maintains rename locks and issues rename locks upon request by the lock acquisition unit. A rename lock prevents an object (e.g., file) from being renamed. For example, if a rename lock is acquired for a file named "A," an operation to rename the file to "B" will be blocked. A rename operation may be similar to a move as the rename operation may specify that a file in one location be renamed to another file in a different location. If the other file exists, it may be overwritten. If the other file does not exist, it may be created. When a rename lock is acquired for a file, another rename operation on that same file is not allowed to proceed.

The inode lock manager maintains inode locks and issues inode locks upon request by the lock acquisition unit. There can be read locks (also referred to as shared locks) and write locks (also referred to as exclusive locks). Read locks can be held by multiple processes at the same time. A write or exclusive lock, however, can only be held by one process, and cannot coexist with a read lock. To acquire a read lock, a process must wait until no processes hold any exclusive lock. To acquire a write lock, a process must wait until no processes hold either kind of lock. For example, during a read operation, an inode read lock may be acquired on an inode of an associated file. The inode read lock allows other processes to read the file concurrently. During a write operation, an inode write lock may be acquired on the inode so that only one process is writing to the file while other processes are also blocked from reading the file.

Figure 3:
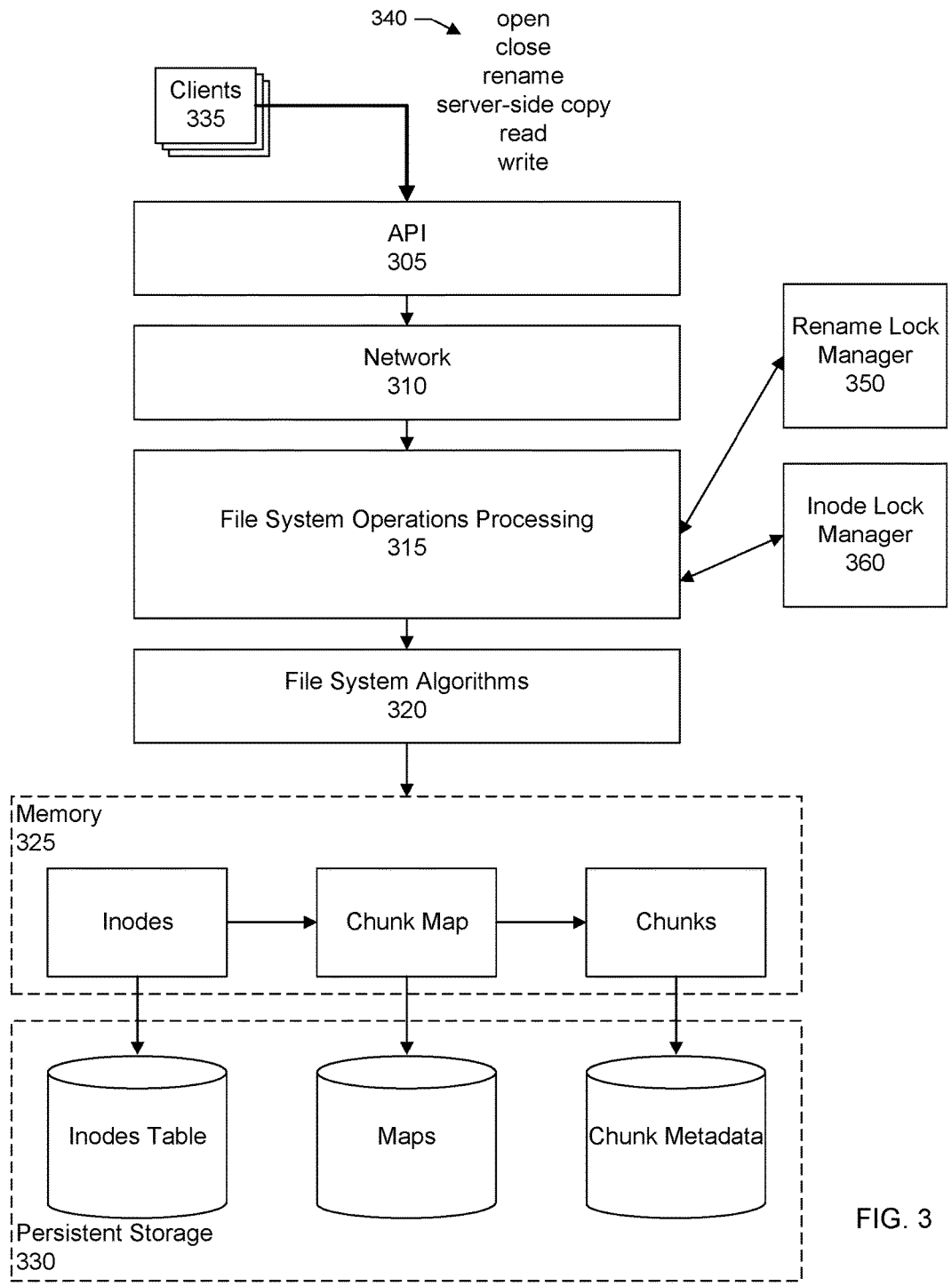
FIG. 3 shows a layer description of a file system metadata server, under some embodiments.

FIG. 3 shows a layer description of the file system metadata server. The metadata server includes an application programming interface (API) layer 305, network layer 310, file system operations processing layer 315, file system algorithms 320, memory layer 325, and persistent storage layer 330.

Clients 335 issue to the API layer requests for file system operations 340 (e.g., open a file, close a file, rename a file, copy a file, read a file, write to a file, and the like). Requests are passed from the API layer to the network layer which routes the various packets of data. The file system operations processing layer, upon receipt of a request (e.g., server-side copy request), acquires as appropriate locks from rename and inode lock managers 350, 360, respectively. Once the locks have been obtained, instructions are provided to the file system algorithms processing layer to fulfill and process the requested file system operation. The processing may include, for example, manipulating and changing information including data structures in memory, and persisting to storage.

Figure 4:
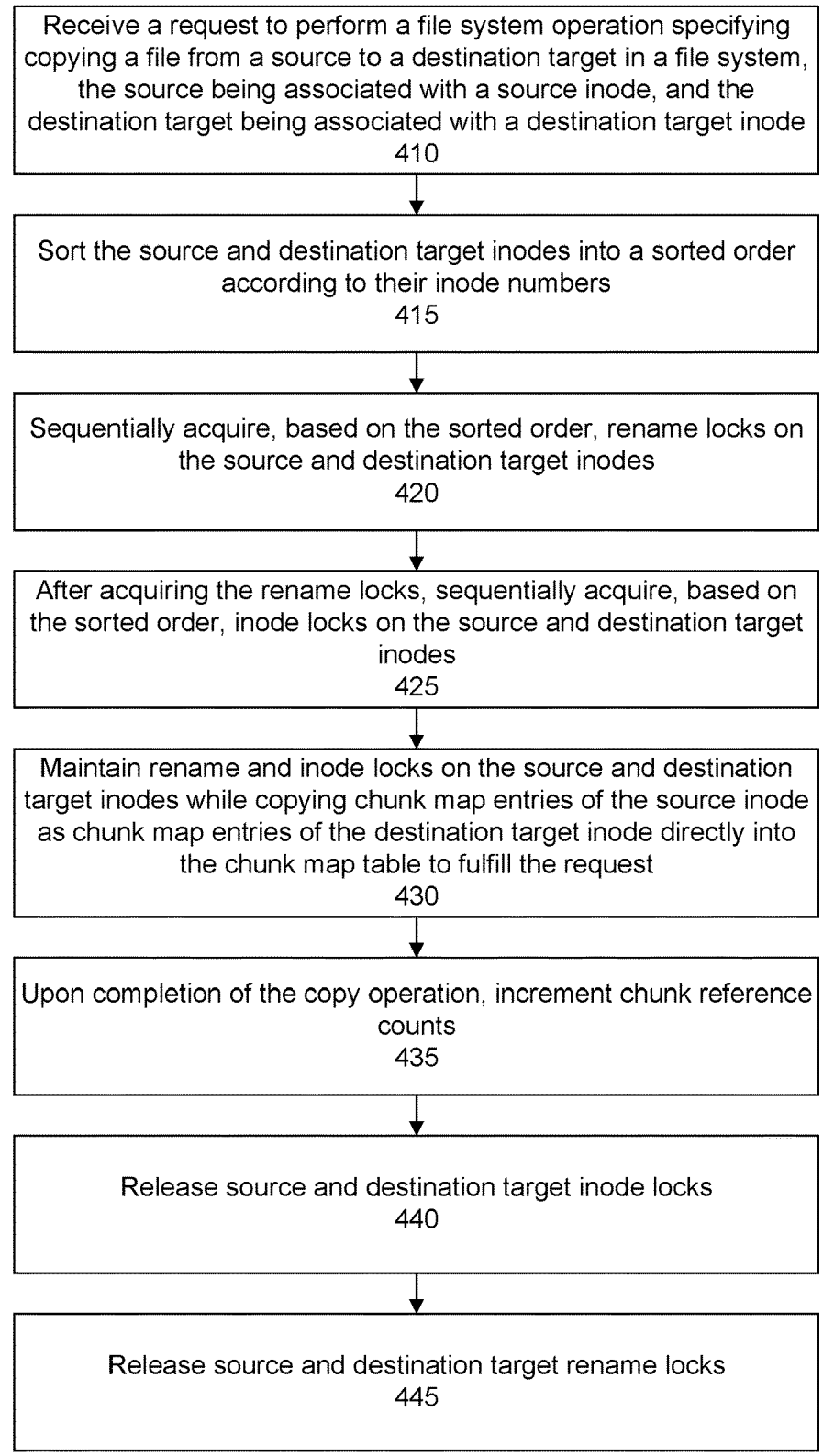
FIG. 4 shows an overall flow of a process for deadlock-free locking for consistent and concurrent operations, under some embodiments.

FIG. 4 shows an overall flow of a process for deadlock-free locking for consistent and concurrent file system operations in file systems. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a request is received to perform a file system operation specifying copying a file from a source to a destination target in a file system, the source being associated with a source inode, and the destination target being associated with a destination target inode. In an embodiment, the file system operation includes a server-side file copy operation. A server-side file copy operation allows a client to perform a file copy on the server without the data being transmitted back and forth over the network. For example, rather than the client reading the entire file from the object store and then writing the file back to the object store, the client is able to instruct the server to copy the data locally (e.g., with respect to the server) without the data being sent back and forth over the network. Such an operation can be purely a metadata operation where file to data chunk map entries of a source inode are copied as chunk map entries of a target inode. Source and target inodes need to be locked while chunk map entries are copied. In some cases where the file system is a deduplicated file system, file data chunks are not copied but their reference counts are incremented.

Figure 5:
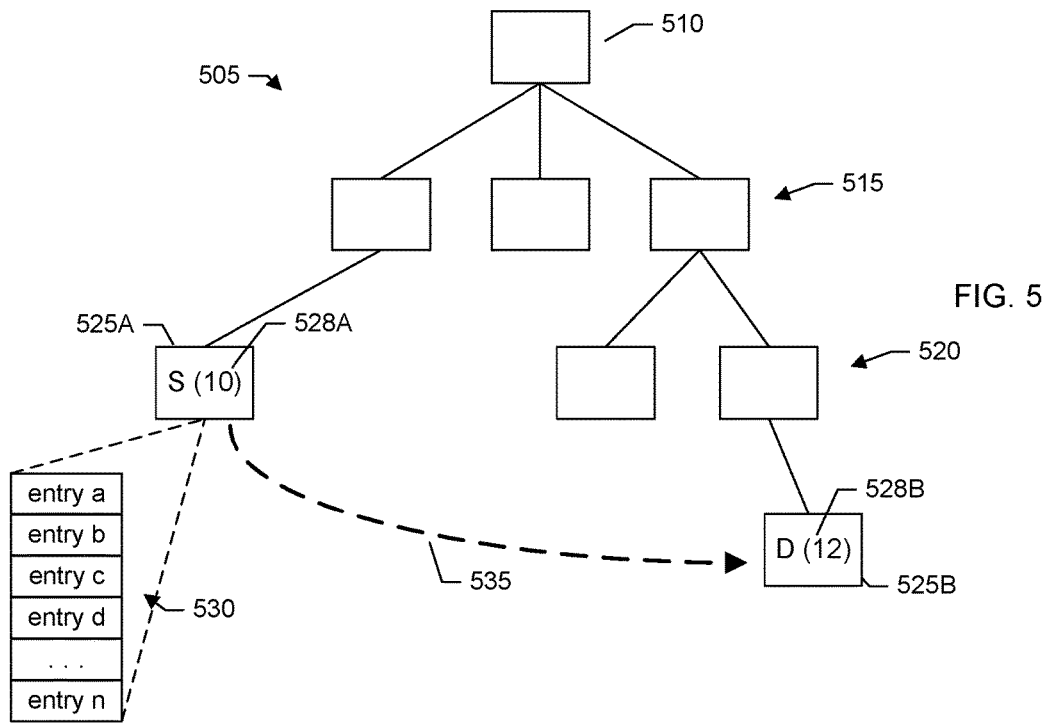
FIG. 5 shows an example of inodes in a file system as a tree hierarchy.

More particularly, FIG. 5 shows a diagram of a file system as arranged in a tree hierarchy of inodes 505, each inode representing a file. The hierarchy includes any number of directories, subdirectories, and files, including a root 510, parents 515, and children 520. Consider, as an example, a request is received to perform a server-side copy of a source to a destination target. The source includes a source file (represented by a source inode 525A); and the destination includes a destination file (represented by a destination inode 525B). The source inode includes metadata and refers to a chunk map having chunk map entries 530 that are to be copied 535 as chunk map entries of the destination inode.

To perform the server-side copy (SSC) operation consistently, a read (also referred to as "shared") lock may be acquired for the source inode and a write (also referred to as "exclusive") lock may be acquired for the target inode. Since multiple inode locks are acquired there are chances of deadlock. For example, a buggy client can simultaneously request two server-side copy operations for File1→File2 and File2→File1. If each operation obtains a lock for one file, they deadlock waiting to obtain a lock for the other file. In other words, consider a scenario in which locks are acquired on both the source and destination inodes. A first SSC operation is received to copy File1 to File2. A lock is acquired on an inode associated with File1. However, before a lock can be acquired on File2, a second SSC operation is received to copy File2 to File1. A lock is then acquired on an inode associated with File2. Both operations will then be deadlocked by waiting for each other's lock to be released.

Locking only one inode also has drawbacks. For example, there can be a reference counter variable that tracks a number of files referring to a chunk. Chunks that are not referred to by a file may be removed or deleted. In other words, if a reference counter for a chunk drops to "0" the chunk may be removed because there are no files that are referring to the chunk. Consider the scenario where the source inode is locked, the metadata (e.g., chunk map entries) associated with the source inode is copied to a temporary table, the lock on the source inode is released upon completion of the copying to the temporary table, a lock is acquired on the destination inode, and the metadata is then copied from the temporary table to the destination inode. The reference counter may not be incremented when copying to a temporary table. So, in this example, once the lock on the source inode is released, a request may be received to delete the file—while the metadata from the temporary table is still being copied to the destination inode.

However, since the lock has been removed, the request to delete may be allowed which, in turn, decrements the reference counter. Thus, if a chunk was referred to by only a single file the reference counter would drop from "1" to "0," and the chunk would be dereferenced by the source and removed. The temporary table, however, may still be referencing the dereferenced chunk. The destination file may then be corrupted because it may include a reference to a chunk which no longer exists. Furthermore, incrementing the reference counter when copying to a temporary table may not address deadlocking when, for example, there is a first request to copy a first file to a second file, and a second request, concurrent with the first request, to copy the second file to the first file, as discussed above.

It is desirable to have a deadlock-free solution to acquire multiple locks for server-side copy. It is also desirable, however, that such a solution not increase contention and impact concurrency of all the other file system operations.

In regards to deadlock avoidance, file system operations can acquire locks on inodes by traversing the file path from root inode to the file inode. The parent inode is locked before the lock can be acquired for the child inode. This mechanism prevents deadlocks among concurrent file operations.

In a specific embodiment, ordering on inode numbers is used to acquire locks for a server-side copy operation. More particularly, as discussed above, each inode is associated with or has a unique inode number. For example, source inode 525A may have a first inode number 528A (e.g., "10"); and destination inode 525B may have a second inode number 528B (e.g., "12"), different from the first inode number. In this specific embodiment, for a server-side copy operation, source and target inodes are ordered according to their inode numbers and locks are always taken in that order. This way, multiple concurrent server-side copy operations will always acquire locks in the same order and will never deadlock. In an embodiment, locks are acquired or obtained sequentially, in a specific sequence, as a series of acquisitions, or consecutively according to a specific order. For example, a first lock for a first inode may be acquired. After the first lock is acquired, a second lock for a second inode may be acquired. Depending on factors such as the type of inode (e.g., source inode versus destination inode), ordering sequence (e.g., lowest to highest versus highest to lowest), or both, the lock may include a rename read lock, a rename write lock, an inode read lock, or an inode write lock.

In this specific embodiment, the technique does not change how locks are acquired in other file systems operations such as open, close, rename, and so forth. These operations continue to use path traversal for lock acquisition. This technique is deadlock-free with other file operations that acquire locks using path traversal and is also deadlock-free when multiple concurrent server-side copy operations use inode numbers for acquiring locks.

In regards to concurrency optimization, it is not sufficient to just provide for deadlock avoidance. Thus, the technique is also contention-free and does not impact concurrency of other file system operations. In a specific embodiment, rename and "delete on close" file operations, first acquire a rename lock on the inode and then acquire the inode lock. As discussed above, rename locks are maintained in a separate lock manager structure than that of the inode lock manager. In a rename file operation, a rename lock is first taken on the inode, then write lock is acquired on the root inode of the file system. Once the operation has a write lock on the root inode, it can acquire write locks on the rename operation's source and destination inodes using path traversal.

A server-side copy process that just acquires inode locks has drawbacks because the concurrency of the file system is impacted when server-side copy and rename operations are run concurrently. For example, consider the scenario where a server-side copy operation results in acquiring a lock on the inode and rename operation is also run on the same inode. The rename operation will result in acquiring a rename lock on the inode; it will then lock the root inode of the file system and then try to acquire inode lock. But, the rename operation will have to wait since server-side copy operation has the inode lock. The rename operation will wait while holding the write lock on the root inode, thereby stopping all other file system operations on the file system.

To prevent this contention, in a specific embodiment, a process to perform a server-side copy operation first acquires rename locks on source and target inodes. This way, other rename operations will not wait while holding the root inode lock, they will wait to first obtain a rename lock on the inode. When multiple concurrent server-side copy, rename or delete on close operations are requested for the same inode, they are serialized on the rename lock of the inode. Even though the operations will wait to acquire a rename lock, they do not hold inode locks on any other inodes in the path thereby keeping operation on all other inodes parallel.

Taking or acquiring multiple rename locks can cause deadlocks. These deadlocks, however, are again avoided by acquiring multiple rename locks also in the order of inode numbers. In an embodiment, for a server-side copy, rename locks on a source inode are read locks. There can be several server-side copy operations where the source inode is the same can proceed in parallel, thereby increasing concurrency.

For example, referring back now to FIG. 4, in a step 415, the source and destination target inodes are arranged, organized, or sorted into a sorted order according to their associated inode numbers. In other words, the source and destination inodes may be sorted or arranged sequentially or consecutively based on inode number.

Figure 6:
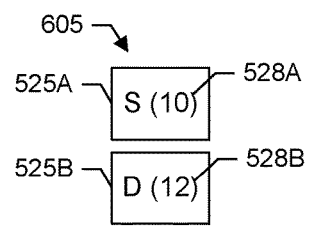
FIG. 6 shows an example of ordering inodes according to inode numbers from lowest inode number to highest inode number for lock acquisition, under some embodiments.

FIG. 6 shows a sorted listing of inodes 605, based on inode number, from lowest inode number to highest inode number. In this example, source inode 525A is ordered first in the list and is followed next by destination inode 525B. In other words, the source inode occupies an initial position in the list and the destination inode occupies a next position in the list after the initial position.

Destination inode 525B is after source inode 525A because in this example the inode number of the source inode ("10") is less than the inode number of the destination inode ("12"). In a specific embodiment, as shown in the example of FIG. 6, the configured sort order is ascending based on inode number (e.g., increasing numerical order of inode numbers), an ordered list is generated indicating an order in which locks are to be acquired, and the sorting may include comparing an inode number of a source inode to an inode number of a destination target inode. If the inode number of the source is less than the inode number of the destination, the source inode is ordered in the list before the destination inode, and the destination inode is ordered in the list after the source inode. If the inode number of the source is greater than the inode number of the destination, the source inode is ordered in the list after the destination inode, and the destination inode is ordered in the list before the source inode. Sorted listing 605 is an example of sorting the inodes in ascending or increasing numerical order according to inode number.

Figure 7:
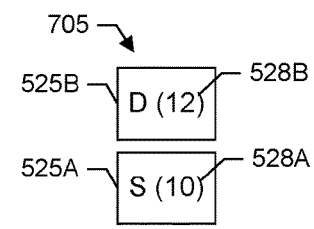
FIG. 7 shows an example of ordering inodes according to inode numbers from highest inode number to lowest inode number for lock acquisition, under some embodiments.

The sort order, however, may be reversed from what is shown in FIG. 6. That is, the sort order may instead be descending or from highest inode number to lowest inode number. For example, FIG. 7 shows another sorted listing of inodes 705, based on inode number. The sorted listing shown in FIG. 7 is similar to the sorted listing shown in FIG. 6. In the example of FIG. 7, however, the inodes have been sorted from highest inode number to lowest inode number. In other words, in this example, destination inode 525B is the first or initial inode in the ordered listing and the next inode in the order is source inode 525A. Source inode 525A is after destination inode 525B because in this example the inode number of the destination inode ("12") is greater than the inode number of the source inode ("10"). Sorted listing 705 is an example of sorting the inodes in descending numerical order according to inode number.

Thus, while some embodiments are shown and described as sequentially acquiring locks based on increasing numerical order of inodes numbers, it should be appreciated that the sorting order may be ascending or descending as long as a consistent ordering scheme is maintained throughout the lock acquisition process.

In brief, Table A below provides a flow for using inode number ordering to acquire inode locks on source and target inodes. As discussed above, in an embodiment, ordering on inode numbers to obtain multiple locks is only for server-side copy (SSC) and it does not change or affect how CREATE and RENAME operations obtain multiple locks.

TABLE A

| Step | Description |
| --- | --- |
| 1 | Sort source and target inodes according to their inode numbers. |
| 2 | Take rename read lock on source inode and rename write lock on target inode in increasing numerical order of inode numbers. |
| 3 | Take read lock on source and write lock on target in increasing numerical order of inode numbers. |
| 4 | Process SSC, by copying chunk map entries directly into chunk map table, i.e., no temporary table is required. |
| 5 | Release all locks (including rename locks on source and target inodes). |

Figure 16:
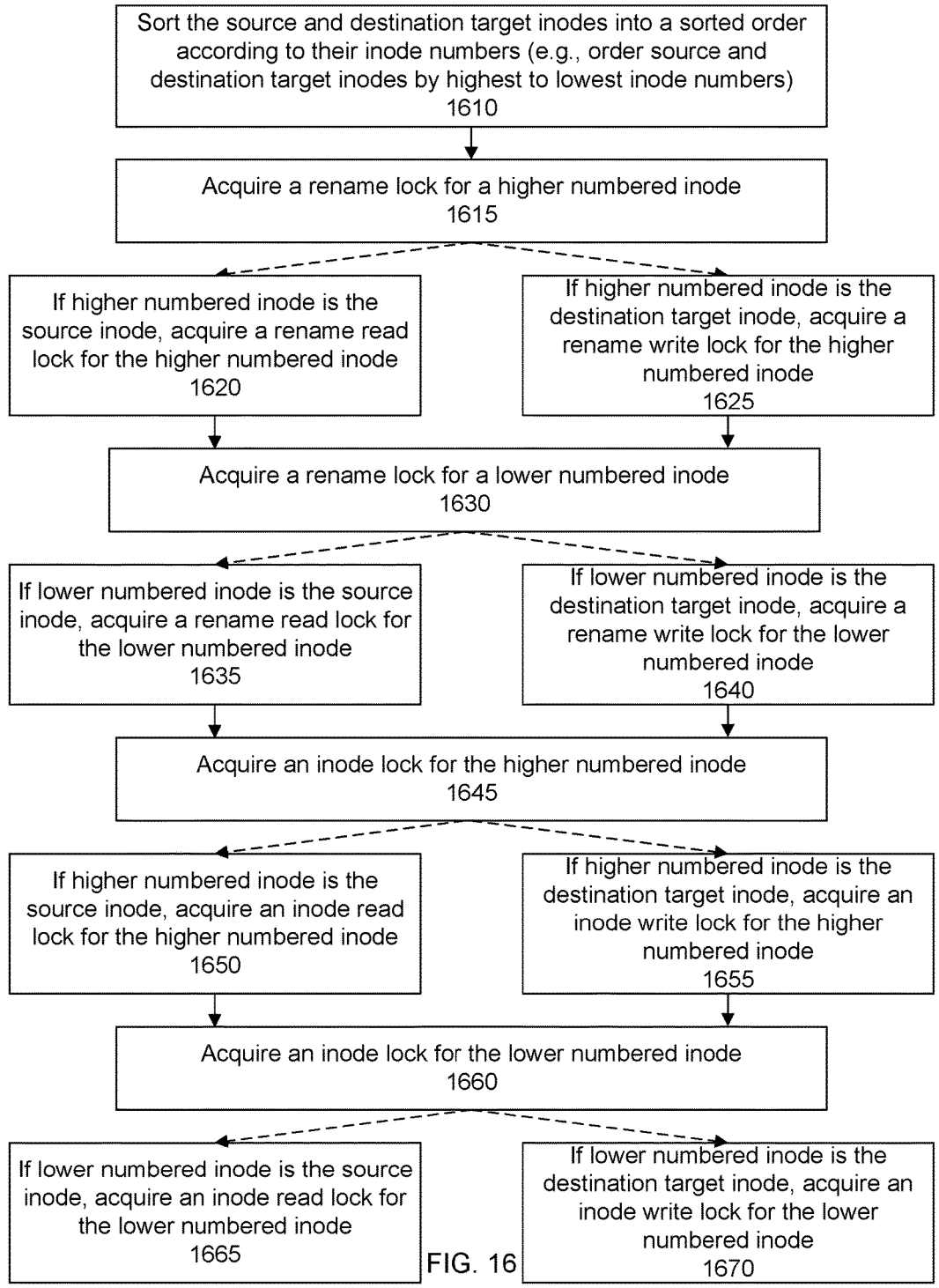
FIG. 16 shows another flow for acquiring locks, under some embodiments.

Again, while the flow in Table A above describes acquiring locks in increasing numerical order of inode numbers, it should be appreciated that the locks may instead be acquired in decreasing numerical order of inode numbers as long as the ordering scheme chosen—e.g., sorted in ascending order according to inode number or sorted in descending order according to inode number—remains consistent throughout the lock acquisition process (see, e.g., FIG. 16 and discussion accompanying FIG. 16).

In this specific embodiment, only a rename read lock is taken on the source inode. This allows a first server-side copy operation of a source to a first destination and a second server-side copy operation of the same source to a second destination, different from the first destination, to happen or occur in parallel. In other words, the second server-side copy operation may be processed simultaneously with the first server-side copy operation, concurrently with the first server-side copy operation, or during, or while the first server-side copy operation is being processed.

In this specific embodiment, rename locks are released after the server-side copy (SSC) process is complete and not immediately after read and write inode locks are acquired. This is because if rename locks are released immediately after read and write locks are taken, then another rename process on the these inodes can be received and which will obtain the rename lock. The process will then attempt to obtain the inode lock, for which it will start acquiring write locks on the root and all inodes from root to the inode. But since SSC has the inode lock, the rename operation will wait but it will wait holding exclusive locks on the root and inodes from root to the inode. This will block CREATE, RENAME, and DELETE operations on other inodes, impacting concurrency on the share. It is desirable to keep or maintain rename locks on the inodes until SSC completes, so that all CREATE, RENAME, and CLOSE (delete on close) operations on the inodes involved in SSC wait for SSC to complete without acquiring any other locks.

Figure 8:
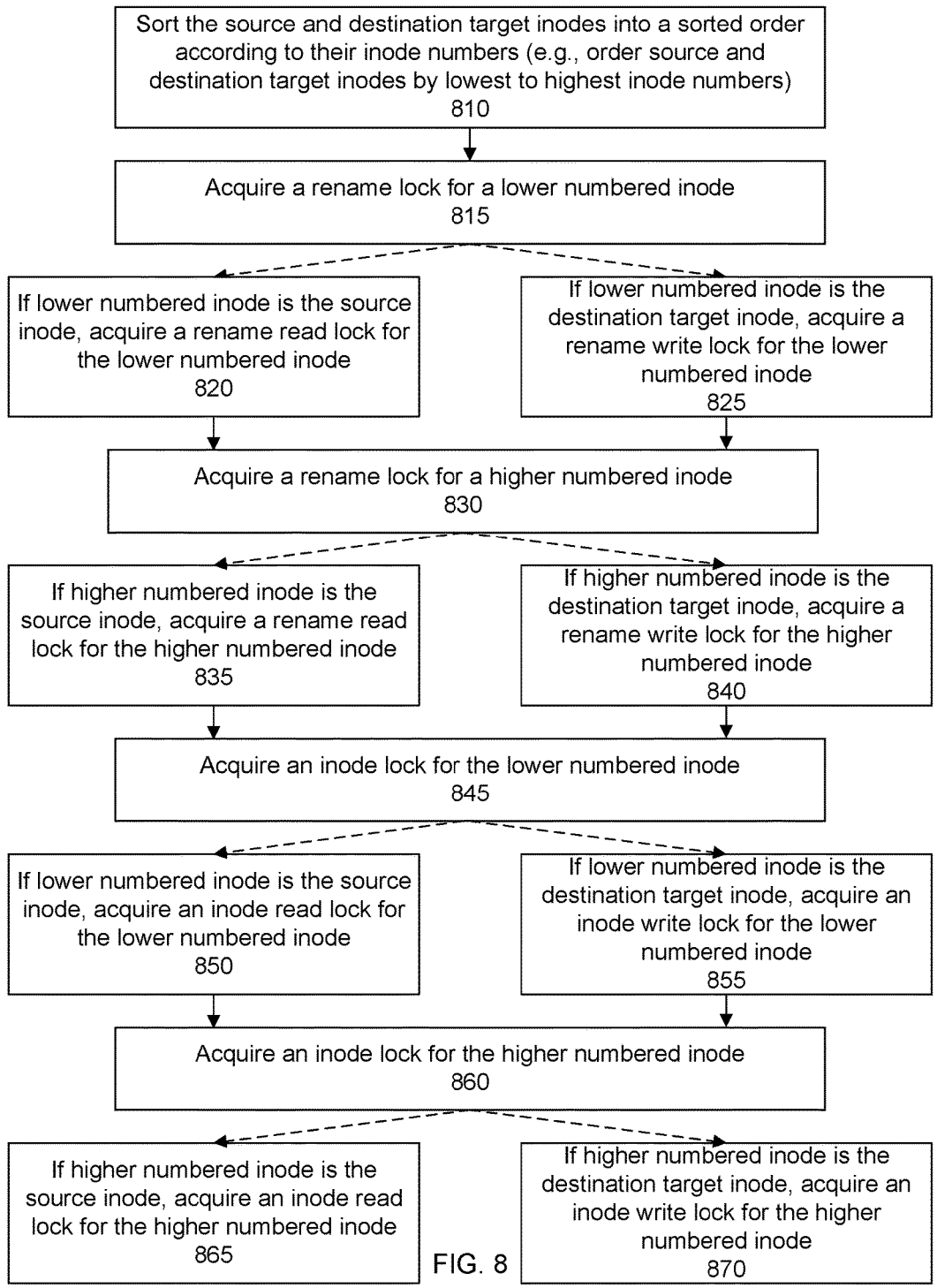
FIG. 8 shows further detail of a flow for acquiring locks, under some embodiments.

More particularly, referring back now to FIG. 4, in a step 420, the lock acquisition unit sequentially acquires, based on the sorted order, rename locks on the source and destination target inodes. FIG. 8 shows further detail of a flow for acquiring the rename locks. In this example, source and destination target inodes have been sorted by lowest inode number to highest inode number (step 810). As discussed above, however, the sort order may be reversed (see, e.g., FIG. 16) as long as the ordering scheme chosen remains consistent throughout.

In a step 815, after the source and destination target inodes have been sorted according to inode number (step 810), a rename lock is acquired for a lower numbered inode (as the sort order chosen in the example of FIG. 8 is ascending inode numbers).

If the lower numbered inode is the source inode, in a step 820, a rename read lock is acquired for the lower numbered inode. Alternatively, if the lower numbered inode is the destination target inode, in a step 825, a rename write lock is acquired for the lower numbered inode.

Next, in a step 830, a rename lock is acquired for a higher numbered inode. If the higher numbered inode is the source inode, in a step 835, a rename read lock is acquired for the higher numbered inode. Alternatively, if the higher numbered inode is the destination target inode, in a step 840, a rename write lock is acquired for the higher numbered inode.

Figure 9:
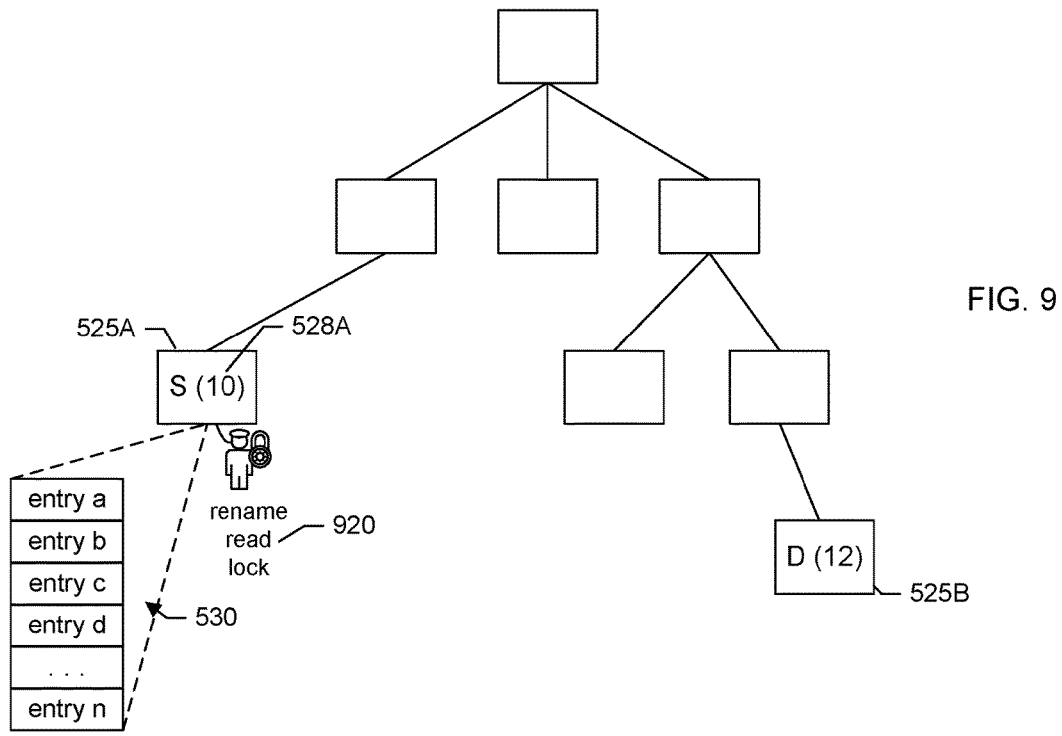
FIG. 9 shows an example a rename read lock having been acquired, under some embodiments.
Figure 10:
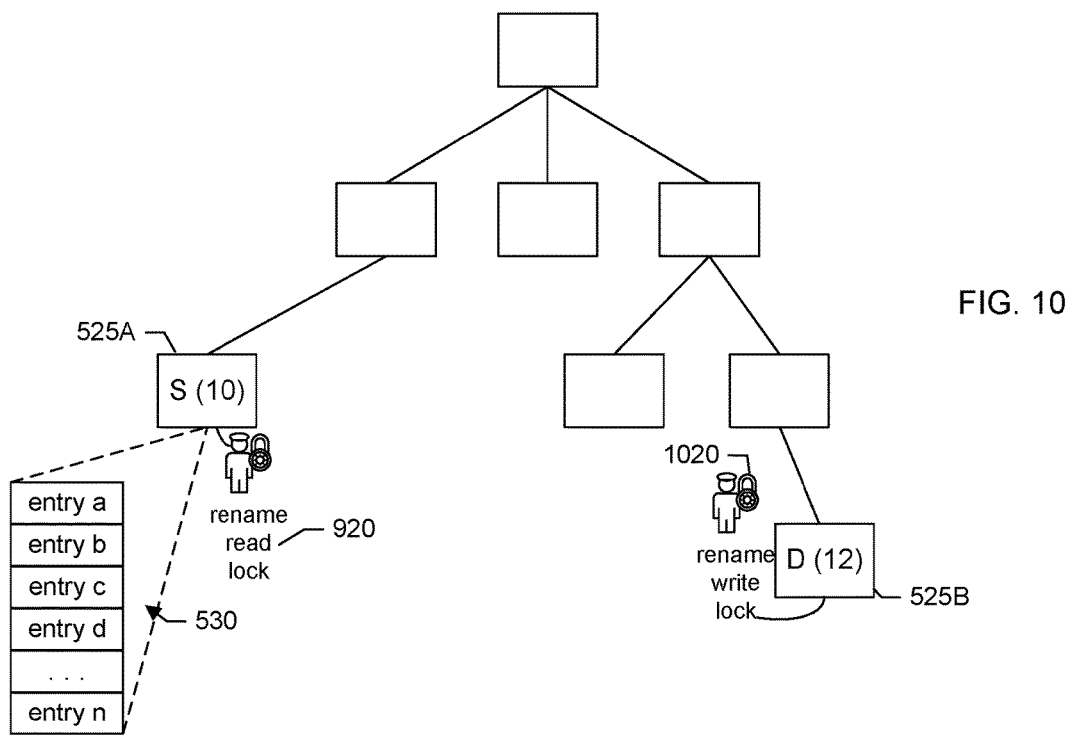
FIG. 10 shows an example of a rename write lock having been acquired, under some embodiments.

FIG. 9 shows an example of the tree from FIG. 5 in a second state of processing the server-side copy operation where a rename read lock 920 has been acquired on source inode 525A (step 820, FIG. 8). FIG. 10 shows an example of the tree from FIG. 9 in a third state of processing the server-side copy operation, after the second state, where a rename write lock 1020 has been acquired on destination target inode 525B (step 840, FIG. 8).

Referring back now to FIG. 4, in a step 425, after acquiring the rename locks, the lock acquisition unit sequentially acquires, based on the sorted order, inode locks on the source and destination target inodes. FIG. 8 shows further detail of the inode lock acquisition process. In a step 845, an inode lock is acquired for the lower numbered inode as in this example the sorted order is ascending (step 810).

If the lower numbered inode is the source inode, in a step 850, an inode read lock is acquired for the lower numbered inode. Alternatively, if the lower numbered inode is the destination target inode, in a step 855, an inode write lock is acquired for the lower numbered inode.

Next, in a step 860, an inode lock is acquired for the higher numbered inode. If the higher numbered inode is the source inode, in a step 865, an inode read lock is acquired for the higher numbered inode. Alternatively, if the higher numbered inode is the destination target inode, in a step 870, an inode write lock is acquired for the higher numbered inode.

Figure 11:
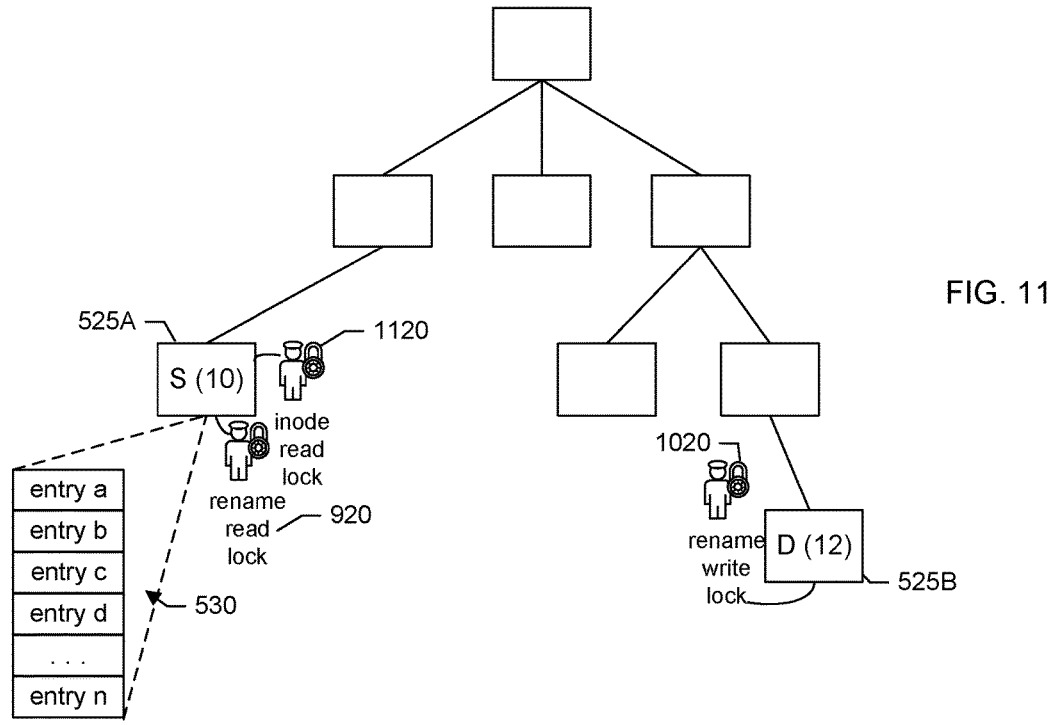
FIG. 11 shows an example an inode read lock having been acquired, under some embodiments.
Figure 12:
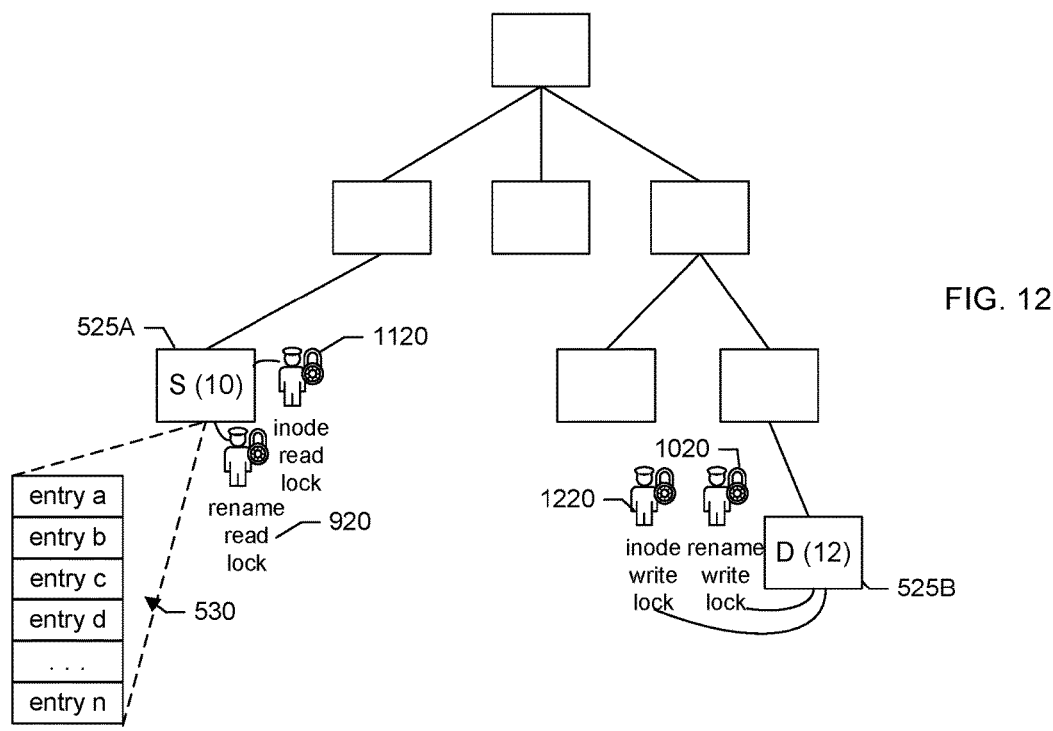
FIG. 12 shows an example of an inode write lock having been acquired, under some embodiments.

FIG. 11 shows an example of the tree from FIG. 10 in a fourth state of processing the server-side copy operation, after the third state, where an inode read lock 1120 has been acquired on source inode 525A (step 850, FIG. 8). FIG. 12 shows an example of the tree from FIG. 11 in a fifth state of processing the server-side copy operation, after the fourth state, where an inode write lock 1220 has been acquired on destination inode 525B (step 870, FIG. 8).

Referring back now to FIG. 4, in a step 430, the rename and inode locks on the source and destination target inodes are maintained while chunk map entries of the source inode are copied as chunk map entries of the destination target inode directly into the chunk map table to fulfill the server-side copy operation request. In other words, locks including the: 1) inode read lock on the source inode, 2) inode write lock on the destination target inode, 3) rename read lock on the source inode, and 4) rename write lock on the destination target inode remain in place while or during the copying of the chunk map entries of the source inode as chunk map entries of the destination target inode in the chunk map.

Figure 13:
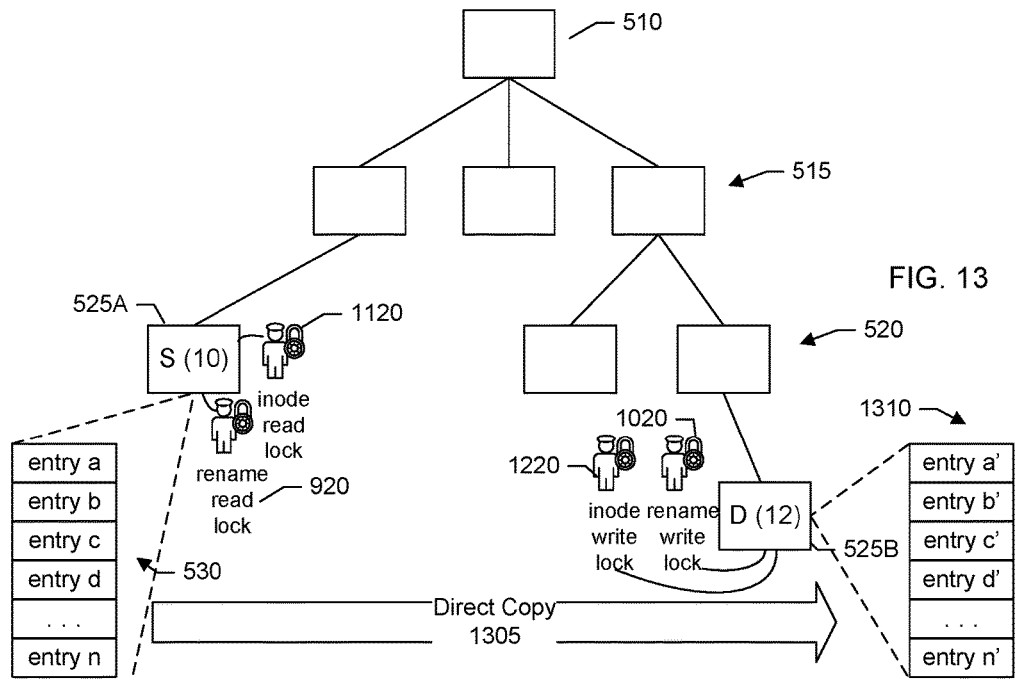
FIG. 13 shows an example of a direct copy of a source inode to a destination inode while rename and inode locks are maintained, under some embodiments.

This technique of acquiring the locks allows for the copying to be performed without having to copy the chunk map entries into a temporary table and then copy from the temporary table to the chunk map as chunk map entries of the destination target inode. FIG. 13 shows an example of copying 1305 chunk map entries 530 of the source inode (entries a-n) as chunk map entries 1310 of the destination target inode (entries a'-n') directly into the chunk map.

Depending on the size of the file and, more particularly, the number of chunk entries to update, the operation may take a significant amount of time to complete. However, because rename locks have first been acquired for the server-side copy operation, deadlocking with respect to rename operations can be avoided. Thus, even if an actual rename operation request is received while a server-side copy operation is being processed on those same inodes, the actual rename operation will not result in the holding of any rename locks (and thus potentially deadlocking) until the server-side copy operation is complete. The actual rename operation will wait for the rename lock to be released by the server-side copy operation.

Figure 14:
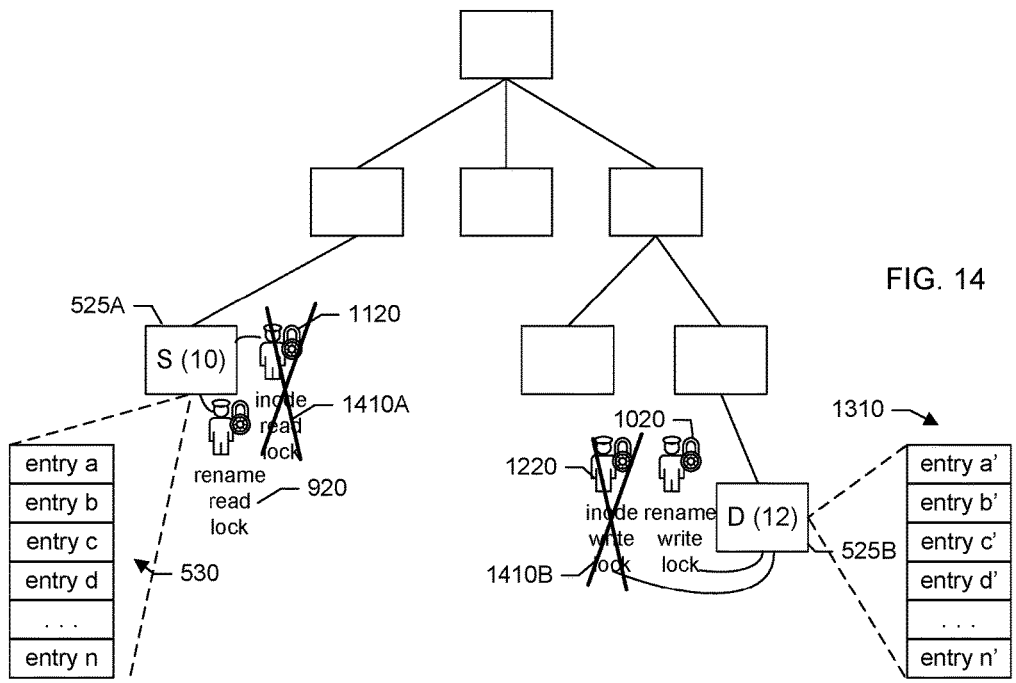
FIG. 14 shows an example of inode locks having been released, under some embodiments.
Figure 15:
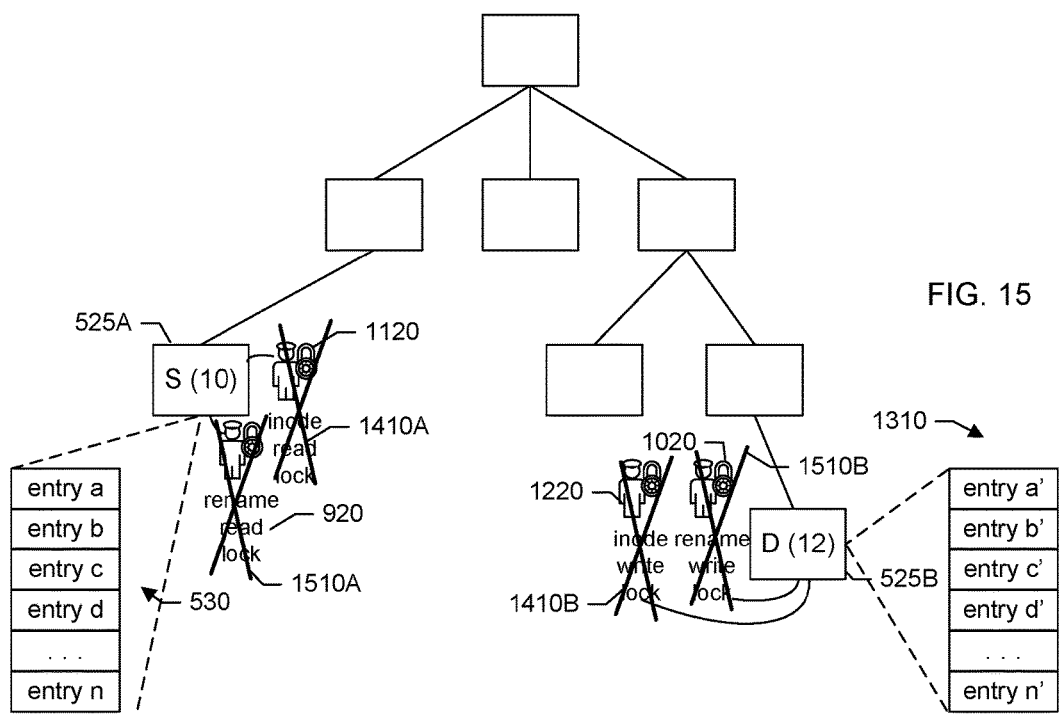
FIG. 15 shows an example of rename locks having been released, under some embodiments.

Referring back now to FIG. 4, in a step 435, upon completion of the server-side copy operation, chunk reference counts are incremented. In a step 440, the source and destination target inode locks are released (see, e.g., FIG. 14 showing inode locks in strike-through 1410A, 1410B, respectively, to indicate their release). In a step 445, the source and destination target rename locks are released (see, e.g., FIG. 15 showing rename locks in strike-through 1510A, 1510B, respectively, to indicate their release).

Sorting the source and target inodes according to their inode numbers and acquiring both rename and inode locks according to the inode ordering helps to maintain concurrency and avoid deadlocks involving file system operations such as CREATE, RENAME, SSC, and other operations. Operations such as RENAME, CREATE, and DELETE on the source and target will wait for the SSC operation to complete. While the wait can be long as the SSC process may copy many database entries, deadlocking can be avoided.

For example, in continuing with the example shown in FIG. 5 above, consider that a second request is received to perform a server-side copy involving destination target inode 525B (inode number "12") to source inode 525A (inode number "10"), while the first request to copy source inode 525A to destination target inode 525B is still in progress. Again, the inodes are sorted or arranged according to inode number and an attempt will be made to acquire the locks according to the inode number ordering. In this example, the configured ordering is lowest to highest. So, the second request results in an attempt to acquire a lock on source inode 525A because its inode number of "10" is lower than the inode number of destination inode 525B ("12").

Since, however, the first request has already resulted in obtaining the lock on source inode 525A, the second request will wait and will not result in an attempt to obtain a lock on destination inode 525B because the ordering (in this example) requires that the lock first be acquired for the lower numbered inode (e.g., source inode 525A). The first request can proceed to acquire a lock on destination target inode 525B while the second request waits or is suspended until the locks are released after the fulfillment or processing of the first request. In other words, the inode ordering technique to acquire locks helps to ensure that an operation cannot hold one lock while waiting for another lock to become available. The technique helps to ensure that an operation either obtains locks on both inodes or none of the inodes. In other words, locks can be obtained atomically. By also obtaining during a server-side copy operation rename locks in a like manner, deadlocking with a rename operation is also avoided.

FIG. 16 shows a detailed flow for acquiring locks when inodes are sorted from highest to lowest according to another specific embodiment. The flow shown in FIG. 16 is similar to the flow shown in FIG. 8. In FIG. 16, however, the sort order of the inodes based on inode number is reversed from what is shown in FIG. 8. More particularly, as shown in the example of FIG. 16, the source and destination target inodes are sorted from highest to lowest according to their inode numbers (step 1610). In a step 1615, a rename lock is acquired for a higher numbered inode.

If the higher numbered inode is the source inode, in a step 1620, a rename read lock is acquired for the higher numbered inode. Alternatively, if the higher numbered inode is the destination target inode, in a step 1625, a rename write lock is acquired for the higher numbered inode.

Next, in a step 1630, a rename lock is acquired for a lower numbered inode. If the lower numbered inode is the source inode, in a step 1635, a rename read lock is acquired for the lower numbered inode. Alternatively, if the lower numbered inode is the destination target inode, in a step 1640, a rename write lock is acquired for the lower numbered inode.

In a step 1645, an inode lock is acquired for the higher numbered inode as in this example the sorted order is descending (step 1610).

If the higher numbered inode is the source inode, in a step 1650, an inode read lock is acquired for the higher numbered inode. Alternatively, if the higher numbered inode is the destination target inode, in a step 1655, an inode write lock is acquired for the higher numbered inode.

Next, in a step 1660, an inode lock is acquired for the lower numbered inode. If the lower numbered inode is the source inode, in a step 1665, an inode read lock is acquired for the lower numbered inode. Alternatively, if the lower numbered inode is the destination target inode, in a step 1670, an inode write lock is acquired for the lower numbered inode.

As discussed above, in a specific embodiment, inode number attributes associated with inodes are used to sort or arrange the inodes in particular order for rename and inode lock acquisition in response to a server-side copy operation. In other specific embodiments, other attributes associated with an inode instead of or in addition to inode number may be used to sort or arrange the inodes into a particular order for lock acquisition so long as the inodes can be uniquely identified.

In a specific embodiment, a method includes receiving a request to perform a file system operation specifying copying a file from a source to a destination target in a file system, the source being associated with a source inode, and the destination target being associated with a destination target inode; sorting the source and destination target inodes into a sorted order according to one or more attributes capable of uniquely identifying the source and destination target inodes; sequentially acquiring, based on the sorted order, rename locks on the source and destination target inodes; after the sequentially acquiring the rename locks, based on the sorted order, sequentially acquiring, based on the sorted order, inode locks on the source and destination target inodes; and after the rename locks and the inode locks have been acquired, copying chunk map entries of the source inode as chunk map entries of the destination target inode to fulfill the request.

Below are some various scenarios of operations involving server-side copy under some embodiments.

Scenario 1: Create (By Path) and SSC. This scenario includes concurrent CREATEs and SSC on source or target inodes. If CREATE acquires an inode lock first, SSC waits. CREATE (by path) acquires an inode lock but not a rename lock on the inode. SSC will obtain a rename lock on the inode but will wait for CREATE to finish, to acquire the inode lock. While SSC waits, since it has rename locks, it will stop or prevent other clients from opening (by fileid) or renaming these inodes. It could also hold an inode lock on one inode and wait to get lock on another inode. But it will not be deadlock. Once CREATE releases the inode lock, SSC can proceed.

If SSC obtains the inode locks first, CREATE waits. Create by path obtains read lock from root to all the inodes up to the parent and the write lock on the parent of the inode. It will wait for SSC to release the inode lock. CREATE will therefore wait holding read locks from root to parent and write lock on the parent inode. Since SSC could be a large operation, Create (by path) holding locks can make operations on the tree less concurrent. However, write lock is only on the parent and read locks are from root to parent, so shared access for root and most of the subtree is still there or available.

Once SSC completes, CREATE will obtain the inode lock and complete. It will not deadlock any other CREATE or RENAME operations since it has read locks from root. However, since SSC could be a comparatively long operation (such as in a case where large files are copied), CREATE will be stalled as long as SSC processes.

Scenario 2: CREATE (By File Id) and SSC. This scenario includes Concurrent CREATEs and SSC on source or target inodes. If CREATE locks first, SSC waits. Create by fileid first obtains a rename lock on the inode. If CREATE obtains the rename lock first, SSC will wait since it needs a rename lock to proceed. SSC could hold a rename lock for one inode and wait to obtain a rename lock on another inode. But it will not be deadlocked. It will stop or prevent other clients from opening (by fileid) or renaming the locked inode while it waits. Once Create releases inode lock, SSC can proceed.

If SSC obtains inode locks first, CREATE waits. Since CREATE by file id obtains a rename lock first, it will wait on the rename lock to be released by SSC. CREATE will also not lock inodes along the path from root to the inode while it waits. However, since SSC could be a comparatively long operation (such as in a case where large files are copied), CREATE will be stalled as long as SSC processes.

Scenario 3: RENAME and SSC. In this scenario, a RENAME operation and SSC compete for rename locks first. Whoever obtains the rename lock first, proceeds making the other operation wait for its completion. If the RENAME operation obtains the rename lock on inode first, it can proceed and does not have to wait for SSC. If SSC obtains the rename lock first it can proceed and the RENAME operation has to wait. Since the RENAME operation has to obtain the rename lock first, it will never do path traversal and hold inode locks and wait for SSC to complete. This way the RENAME operation never impacts concurrency of operations on the tree while SSC is in progress.

There may be a case where SSC obtains a rename lock on one inode and when it attempts to obtain a rename lock on the other inode, the other is already locked by a RENAME operation. In which case SSC waits for the RENAME operation to complete. It is holding a rename lock on one inode but not deadlocked. No RENAME or DELETE operation on that inode can proceed till SSC completes.

In the scenario where the same client issues SSC and RENAME concurrently, it can happen that the RENAME operation can move the source or target to a different location while SSC waits to obtain the lock. But since SSC has an open handle to source and target inodes, once the RENAME operation completes and SSC obtains the locks, it can still proceed and complete server-side copy operation.

Scenario 4: CLOSE (Delete on Close) and SSC. In this scenario, the CLOSE operation acquires a write lock on the inode. If the CLOSE operation is in non POSIX mode and 'DELETE_ON_CLOSE' is specified and it is the last open handle, then the CLOSE operation causes or performs the following:
1. Acquires rename lock on inode
2. Takes write lock on parent
3. Releases rename lock
4. Acquires write lock on the inode.

If SSC and CLOSE operations are issued concurrently, whichever operation obtains the lock first proceeds. If the CLOSE operation obtains the rename lock first, then it will obtain a write lock on the inode and SSC will have to wait for the CLOSE operation to finish. Once SSC obtains the locks it can still proceed since it has an open handle and inode should be still there.

If SSC obtains the locks first then it has rename locks and inode locks and it will make the CLOSE operation wait.

In the scenario, that SSC and CLOSE are issued by the same client, there is only one open handle, and CLOSE obtains the lock first, SSC should still be able to proceed once it obtains the lock. It may fail since the file handle is no longer valid.

Scenario 5: SSC and SSC. In this scenario, if multiple SSCs have only the source inode common, they can progress or proceed in parallel since read locks are required on the source inode. For example, if a first server-side copy specifying copying file A to file B, and a second server-side copy specifying copying file A to file C are issued, both can proceed in parallel since both SSCs will obtain a rename read lock on A.

If multiple SSC operations are issued concurrently, having either one or both inodes in common, which requires a write lock, one SSC operation will have to wait for other to complete.

Since SSC first requires obtaining rename locks on both inodes, whichever SSC obtains both locks first proceeds making the other SSC operation wait. Since rename locks are always obtained in the order of inode numbers multiple SSC operations will never deadlock.

Consider the scenario where a first server-side copy specifying copying file A to file C, and second server-side copy specifying copying file B to file C are issued concurrently and the order of inode numbers are A, B, and C. If the first SSC ("A→C") obtains both rename locks first, then the second SSC ("B→C") waits to obtain a rename lock for C while holding a rename lock for B. No CREATE by fileid or RENAME operation can happen on B since SSC is waiting holding B lock. Once the first SSC ("A→C") completes, the second SSC ("B→C") will proceed. There is no deadlock and it is expected for the second SSC ("B→C") to wait.

The following includes a discussion of various other embodiments to handle concurrent access. Specifically, another embodiment includes incrementing reference counts before copying the source chunk map. 1) Since MySQL does not support triggers in temporary tables. An update statement may be used to increment the reference count in chunk meta for map entries copied to temporary table. 2) After entries are copied from the temporary table to the chunk map for the target inode, decrement the reference count in chunk meta with update statement. 3). Drop the temporary table. In this technique, a process that may be referred to as GC will not remove entries being used for SSC since reference count does not reach zero. Some drawbacks, however, may include transactional support to increment reference count after copying to temporary table; extra updates to chunk meta to increase and decrease reference counts; and handling recovery scenarios like SSC operation fails after reference count has been incremented. And, special care to decrement reference counts.

Another embodiment includes a process (e.g., GC) that checks for inode entries involved in SSC operations. This technique involves the GC performing the extra work of checking and not deleting map entries involved in SSC. However, it can requiring storing all inodes involved currently in SSC in a separate table. The GC will have to perform a reverse lookup of chunk entries to these inodes. The GC may become complicated and inefficient.

Another embodiment includes obtaining multiple locks on the source and target inodes including obtaining a read lock on the a source inode and a write lock on the target inode simultaneously; and copying chunk map entries of source into chunk map table with target id. No temporary table is required, and the GC process will not remove entries being used for SSC since reference count does not reach zero. However, this approach is complicated since it requires multiple locks, deadlocks can happen and concurrency can be impacted.

Another embodiment, includes during RENAME operation, a rename lock (in separate rename lock manager) on the source inode is taken first. Then the path is looked up from source inode (inode to rename) to the root. To lookup the path from source inode to root, the path is traversed bottom up. For each inode in the path, a read lock is taken on the inode, the parent inode is looked up and then the lock is released on the inode.

Then read lock is taken on the parent inode and its parent is looked up and this process continues till the path to root is obtained. At any time only one read lock is taken to get the path. A stable path is assured because another rename cannot change the path, since there is an open in the subtree. Write locks are acquired on all inodes in the path from the root inode to the source inode. It then takes read lock on inodes in path from root to the destination object, and takes write lock on parent inode of the destination and write lock on the destination inode if it exists.

Since it takes multiple locks while having write lock on the root, only one multi-lock operation can proceed at a time, deadlocks are avoided. It then releases all write locks on the root and all inodes in the path from root to the source inode, except source inode and its parent. So, write locks to root and the subtree is only during obtaining locks on source and destination inodes and not during the entire rename operation.

For SSC, an attempt is made to acquire locks on the target inode first. There is a lookup of the path from target inode to the root. Write locks are then acquired on the root and all inodes in the path from root to the target inode. There is a lookup of the path from source inode to root and an acquisition of a read lock on inodes in the path from root to the source inode. Then there is a release of all locks on root and in the paths from root to source and root to target, except a read lock on the source and write lock on the target.

Since the write lock on the root is obtained first before acquiring locks on target and source deadlocks are avoided. In scenarios when SSC is issued for copying a first file (file A) to a second file (file B) and from second file B to first file A concurrently, only one SSC will obtain locks on both source and target at a time while the other SSC will wait.

However there is a scenario where, while SSC is processing (and an SSC process can take a long time) a RENAME or CREATE operation is issued on the source or target inode. The rename operation will acquire a write lock on root and the path to the target inode but will have to wait for SSC to complete to get write lock on the target inode. So, the rename operation will wait while holding the root lock impacting concurrency of operations on the share.

To avoid such scenarios, SSC may acquire rename locks on source and target inodes before obtaining a regular read and write locks on source and the target. This way RENAME and CREATE operations wait for SSC to complete before taking any locks. This is also true for an SSC from second file B to first file A while an SSC from first file A to second file B is in progress. One of the SSCs will also wait without acquiring any locks.

Again, however, taking multiple locks on rename lock manager can lead to deadlocks in scenarios where a SSC is issued specifying copying first file A to second file B and another specifying copying from second file B to first file A. Ordering may be introduced in which multiple rename locks can be taken. The inode number can allow for ordering among inodes. So before taking rename locks on source and target inodes they can be ordered according to their inode numbers and rename locks may always taken in that order.

The steps for this include:

1. Sort source and target inodes according to their inode numbers

2. Take Rename read lock on source inode and rename write lock on target inode in increasing numerical order of inode numbers.

3. Lookup path from target inode to root.

4. Get write locks on root and all inodes from root to target inode.

5. Lookup path from source inode to root.

6. Get read locks from root to source inode.

7. Release all locks except read lock on source inode and write lock on target inode.

8. Process SSC, by copying chunk map entries directly into chunk map table, no temp table required.

9. Release all locks (including rename locks on source and target inodes)

In a specific embodiment, method includes receiving a request to perform a file system operation specifying copying a file from a source to a destination target in a file system, the source being associated with a source inode, and the destination target being associated with a destination target inode; sorting the source and destination target inodes into a sorted order according to inode numbers identifying the source and destination target inodes; sequentially acquiring, based on the sorted order, rename locks on the source and destination target inodes; after the sequentially acquiring the rename locks, based on the sorted order, sequentially acquiring, based on the sorted order, inode locks on the source and destination target inodes; and after the rename locks and the inode locks have been acquired, copying chunk map entries of the source inode as chunk map entries of the destination target inode to fulfill the request.

In a specific embodiment, the sorting comprises one of sorting the source and destination target inodes in ascending order according to the inode numbers, or sorting the source and destination target inodes in descending order according to the inode numbers.

The sequentially acquiring, based on the sorted order, rename locks may include if an initial inode in the sorted order comprises the source inode: acquiring a rename read lock on the initial inode; and after the acquiring a rename read lock on the initial inode, acquiring a rename write lock on a next inode in the sorted order, the next inode thereby being the destination target inode.

The sequentially acquiring, based on the sorted order, rename locks may include if an initial inode in the sorted order comprises the destination target inode: acquiring a rename write lock on the initial inode; and after the acquiring a rename write lock on the initial inode, acquiring a rename read lock on a next inode in the sorted order, the next inode thereby being the source inode.

The sequentially acquiring, based on the sorted order, inode locks may include if an initial inode in the sorted order comprises the source inode: acquiring a read inode lock for the initial inode; and after the acquiring a read inode lock, acquiring a write inode lock on a next inode in the sorted order, the next inode thereby being the destination target inode.

The sequentially acquiring, based on the sorted order, inode locks may include if an initial inode in the sorted order comprises the destination target inode: acquiring a write inode lock for the initial inode; and after the acquiring a write inode lock, acquiring a read inode lock for a next inode in the sorted order, the next inode thereby being the source inode.

In a specific embodiment, the method further includes maintaining the rename locks on the source and destination target inodes during the copying chunk map entries of the source inode as chunk map entries of the destination target inode.

In another specific embodiment, there is a system for deadlock-free locking for consistent and concurrent server-side file operations in file systems, the system including: a processor-based system executed on a computer system and configured to execute instructions including: sorting the source and destination target inodes into a sorted order according to inode numbers identifying the source and destination target inodes; sequentially acquiring, based on the sorted order, rename locks on the source and destination target inodes; after the sequentially acquiring the rename locks, based on the sorted order, sequentially acquiring, based on the sorted order, inode locks on the source and destination target inodes; and after the rename locks and the inode locks have been acquired, copying chunk map entries of the source inode as chunk map entries of the destination target inode to fulfill the request.

In another specific embodiment, there is a computer program product, comprising a non-transitory computer-readable medium having a computer-readable program code embodied therein, the computer-readable program code adapted to be executed by one or more processors to implement a method including: sorting the source and destination target inodes into a sorted order according to inode numbers identifying the source and destination target inodes; sequentially acquiring, based on the sorted order, rename locks on the source and destination target inodes; after the sequentially acquiring the rename locks, based on the sorted order, sequentially acquiring, based on the sorted order, inode locks on the source and destination target inodes; and after the rename locks and the inode locks have been acquired, copying a chunk map of the source inode to the destination target inode to fulfill the request.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving a request to perform a file system operation specifying copying a file from a source in a file system to a destination target in the file system, the source being associated with a source inode, and the destination target being associated with a destination target inode;
sorting the source and destination target inodes into a sorted order according to inode numbers identifying the source and destination target inodes, wherein the sorted order indicates a sequence in which a plurality of locks are to be acquired, the plurality of locks comprising a rename read lock for the source inode, a rename write lock for the destination target inode, a read inode lock for the source inode, and a write inode lock for the destination target inode;
sequentially acquiring, based on the sorted order, the rename read lock on the source inode and the rename write lock on the destination target inode by acquiring a first lock on one of the source inode or the destination target inode, the first lock being one of the rename read lock for the source inode or the rename write lock for the destination target inode, and
after acquiring the first lock, acquiring a second lock on another of the source inode or the destination target inode, the second lock being another of the rename read lock for the source inode or the rename write lock for the destination target inode;
after the sequentially acquiring the rename read lock on the source inode and the rename write lock on the destination target inode, based on the sorted order, sequentially acquiring, based on the sorted order, the read inode lock on the source inode and the write inode lock on the destination target inode by acquiring a third lock on one of the source inode or the destination target inode, the third lock being one of the read inode lock for the source inode or the write inode lock for the destination target inode, and
after acquiring the third lock, acquiring a fourth lock on another of the source inode or the destination target inode, the fourth lock being another of the read inode lock for the source inode or the write inode lock for the destination target inode; and
after the rename read lock on the source inode, the rename write lock on the destination target inode, the read inode lock on the source inode, and the write inode lock on the destination target inode have been acquired, copying a chunk map of the source inode to the destination target inode to fulfill the request, wherein the sequentially acquiring, based on the sorted order, the rename read lock on the source inode and the rename write lock on the destination target inode comprises:
if an initial inode in the sorted order comprises the source inode:
acquiring the rename read lock on the initial inode; and
after acquiring the rename read lock on the initial inode, acquiring the rename write lock on a next inode in the sorted order, the next inode thereby being the destination target inode.

2. The method of claim 1 wherein the sorting comprises one of sorting the source and destination target inodes in ascending order according to the inode numbers, or sorting the source and destination target inodes in descending order according to the inode numbers.

3. The method of claim 1 wherein the sequentially acquiring, based on the sorted order, the rename read lock on the source inode and the rename write lock on the destination target inode comprises:
if the initial inode in the sorted order comprises the destination target inode:
acquiring the rename write lock on the initial inode; and
after acquiring the rename write lock on the initial inode, acquiring the rename read lock on the next inode in the sorted order, the next inode thereby being the source inode.

4. The method of claim 1 wherein the sequentially acquiring, based on the sorted order, the read inode lock on the source inode and the write inode lock on the destination target inode comprises:
if the initial inode in the sorted order comprises the source inode:
acquiring the read inode lock on the initial inode; and
after acquiring the read inode lock, acquiring the write inode lock on the next inode in the sorted order, the next inode thereby being the destination target inode.

5. The method of claim 1 wherein the sequentially acquiring, based on the sorted order, the read inode lock on the source inode and the write inode lock on the destination target inode comprises:
if the initial inode in the sorted order comprises the destination target inode:
acquiring the write inode lock on the initial inode; and
after acquiring the write inode lock, acquiring the read inode lock on the next inode in the sorted order, the next inode thereby being the source inode.

6. The method of claim 1 comprising:
maintaining the rename read lock on the source inode, the rename write lock on the destination target inode, the read inode lock on the source inode, and the write inode lock on the destination target inode during the copying the chunk map of the source inode to the destination target inode.

7. A system for deadlock-free locking for consistent and concurrent server-side file operations in file systems, the system comprising:
a processor-based system executed on a computer system and configured to execute instructions comprising:
receiving a request to perform a file system operation specifying copying a file from a source in a file system to a destination target in the file system, the source being associated with a source inode, and the destination target being associated with a destination target inode;
generating a list listing the source and destination target inodes;
sorting the source and destination target inodes, listed in the list, into a sorted order according to inode numbers identifying the source and destination target inodes, wherein the sorted order lists the source and destination target inodes, and indicates a sequence in which a plurality of locks are to be acquired for the source and destination target inodes, the plurality of locks comprising a rename read lock for the source inode, a rename write lock for the destination target inode, a read inode lock for the source inode, and a write inode lock for the destination target inode;
sequentially acquiring, based on the sorted order, the rename read lock on the source inode and the rename write lock on the destination target inode;
after the sequentially acquiring the rename read lock on the source inode and the rename write lock on the destination target inode, based on the sorted order, sequentially acquiring, based on the sorted order, the read inode lock on the source inode and the write inode lock on the destination target inode; and
after the rename read lock on the source inode, the rename write lock on the destination target inode, the read inode lock on the source inode, and the write inode lock on the destination target inode have been acquired, copying a chunk map of the source inode to the destination target inode to fulfill the request, wherein the sequentially acquiring, based on the sorted order, the rename read lock on the source inode and the rename write lock on the destination target inode comprises:
if an initial inode in the sorted order comprises the source inode:
acquiring the rename read lock on the initial inode; and
after acquiring the rename read lock on the initial inode, acquiring the rename write lock on a next inode in the sorted order, the next inode thereby being the destination target inode.

8. The system of claim 7 wherein the sorting comprises one of sorting the source and destination target inodes in ascending order according to the inode numbers, or sorting the source and destination target inodes in descending order according to the inode numbers.

9. The system of claim 7 wherein the sequentially acquiring, based on the sorted order, the rename read lock on the source inode and the rename write lock on the destination target inode comprises:
if the initial inode in the sorted order comprises the destination target inode:
acquiring the rename write lock on the initial inode; and
after acquiring the rename write lock on the initial inode, acquiring the rename read lock on the next inode in the sorted order, the next inode thereby being the source inode.

10. The system of claim 7 wherein the sequentially acquiring, based on the sorted order, the read inode lock on the source inode and the write inode lock on the destination target inode comprises:
if the initial inode in the sorted order comprises the source inode:
acquiring the read inode lock on the initial inode; and
after acquiring the read inode lock, acquiring the write inode lock on the next inode in the sorted order, the next inode thereby being the destination target inode.

11. The system of claim 7 wherein the sequentially acquiring, based on the sorted order, the read inode lock on the source inode and the write inode lock on the destination target inode comprises:
if the initial inode in the sorted order comprises the destination target inode:
acquiring the write inode lock on the initial inode; and
after acquiring the write inode lock, acquiring the read inode lock on the next inode in the sorted order, the next inode thereby being the source inode.

12. The system of claim 7 wherein the processor-based system is configured to execute instructions comprising:

maintaining the rename read lock on the source inode, the rename write lock on the destination target inode, the read inode lock on the source inode, and the write inode lock on the destination target inode during the copying the chunk map of the source inode to the destination target inode.

13. A computer program product, comprising a non-transitory computer-readable medium having a computer-readable program code embodied therein, the computer-readable program code adapted to be executed by one or more processors to implement a method comprising:

receiving a request to perform a file system operation specifying copying a file from a source in a file system to a destination target in the file system, the source being associated with a source inode, and the destination target being associated with a destination target inode;

sorting the source and destination target inodes into a sorted order according to inode numbers identifying the source and destination target inodes, wherein the sorted order indicates a sequence in which a plurality of locks are to be acquired, the plurality of locks comprising a rename read lock for the source inode, a rename write lock for the destination target inode, a read inode lock for the source inode, and a write inode lock for the destination target inode;

sequentially acquiring, based on the sorted order, the rename read lock on the source inode and the rename write lock on the destination target inode by acquiring a first lock on one of the source inode or the destination target inode, the first lock being one of the rename read lock for the source inode or the rename write lock for the destination target inode, and after acquiring the first lock, acquiring a second lock on another of the source inode or the destination target inode, the second lock being another of the rename read lock for the source inode or the rename write lock for the destination target inode;

after the sequentially acquiring the rename read lock on the source inode and the rename write lock on the destination target inode, based on the sorted order, sequentially acquiring, based on the sorted order, the read inode lock on the source inode and the write inode lock on the destination target inode by acquiring a third lock on one of the source inode or the destination target inode, the third lock being one of the read inode lock for the source inode or the write inode lock for the destination target inode, and after acquiring the third lock, acquiring a fourth lock on another of the source inode or the destination target inode, the fourth lock being another of the read inode lock for the source inode or the write inode lock for the destination target inode; and after the rename read lock on the source inode, the rename write lock on the destination target inode, the read inode lock on the source inode, and the write inode lock on the destination target inode have been acquired, copying a chunk map of the source inode to the destination target inode to fulfill the request, wherein the sequentially acquiring, based on the sorted order, the rename read lock on the source inode and the rename write lock on the destination target inode comprises:

if an initial inode in the sorted order comprises the source inode:
acquiring the rename read lock on the initial inode; and
after acquiring the rename read lock on the initial inode, acquiring the rename write lock on a next inode in the sorted order, the next inode thereby being the destination target inode.

14. The computer program product of claim 13 wherein the sorting comprises one of sorting the source and destination target inodes in ascending order according to the inode numbers, or sorting the source and destination target inodes in descending order according to the inode numbers.

15. The computer program product of claim 13 wherein the sequentially acquiring, based on the sorted order, the rename read lock on the source inode and the rename write lock on the destination target inode comprises:

if the initial inode in the sorted order comprises the destination target inode:
acquiring the rename write lock on the initial inode; and
after acquiring the rename write lock on the initial inode, acquiring the rename read lock on the next inode in the sorted order, the next inode thereby being the source inode.

16. The computer program product of claim 13 wherein the sequentially acquiring, based on the sorted order, the read inode lock on the source inode and the write inode lock on the destination target inode comprises:

if the initial inode in the sorted order comprises the source inode:
acquiring the read inode lock on the initial inode; and
after acquiring the read inode lock, acquiring the write inode lock on the next inode in the sorted order, the next inode thereby being the destination target inode.

17. The computer program product of claim 13 wherein the method comprises:

maintaining the rename read lock on the source inode, the rename write lock on the destination target inode, the read inode lock on the source inode, and the write inode lock on the destination target inode during the copying the chunk map of the source inode to the destination target inode.

* * * * *